Jan. 19, 1932. R. JELLINECK 1,841,954
PASSENGER GUARD
Filed April 13, 1931 2 Sheets-Sheet 1
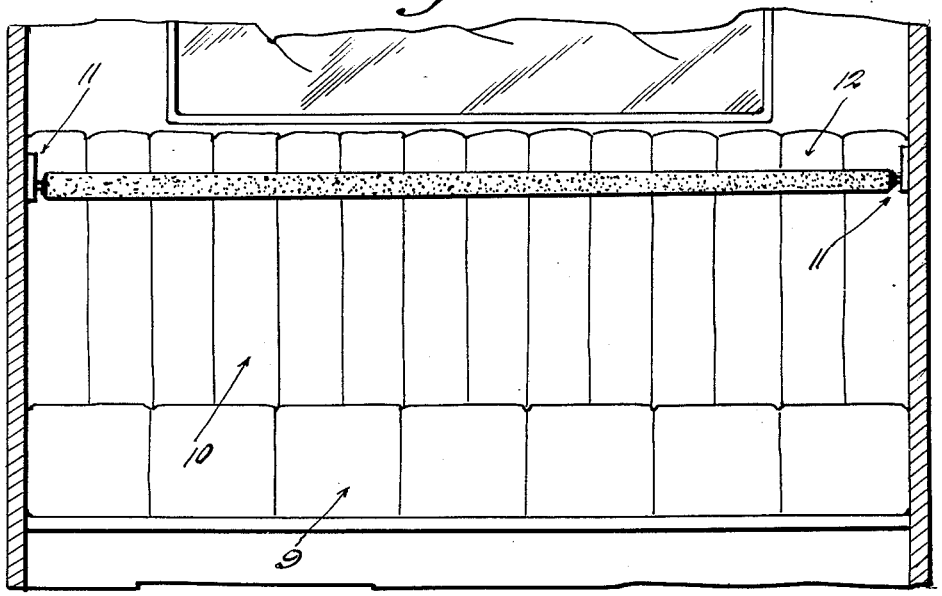
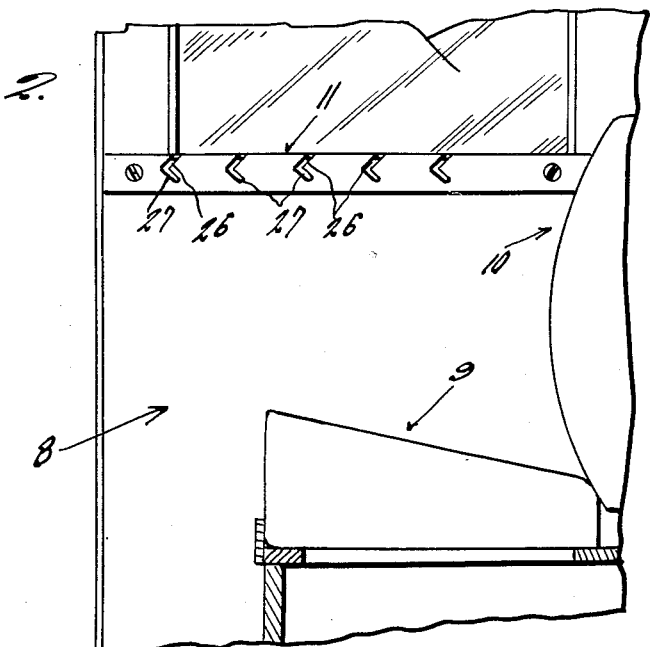
Inventor
Rudolph Jellineck
By Clarence A. O'Brien
Attorney Jan. 19, 1932.    R. JELLINECK    1,841,954
PASSENGER GUARD
Filed April 13, 1931    2 Sheets-Sheet 2
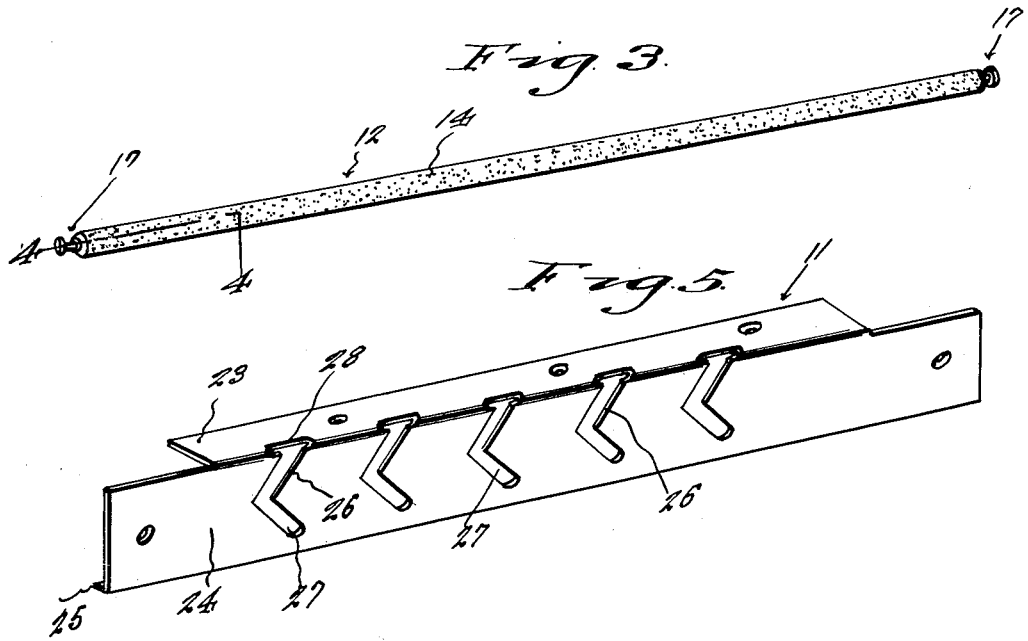
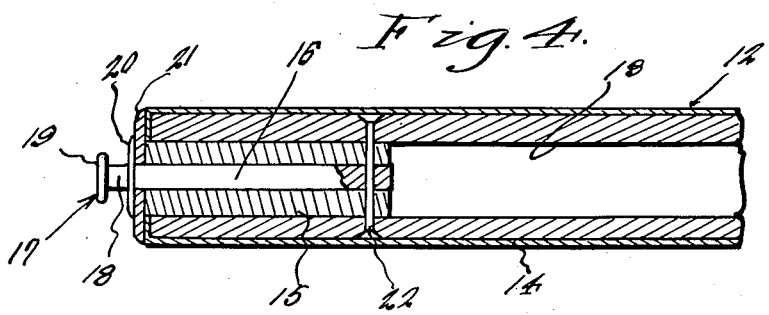
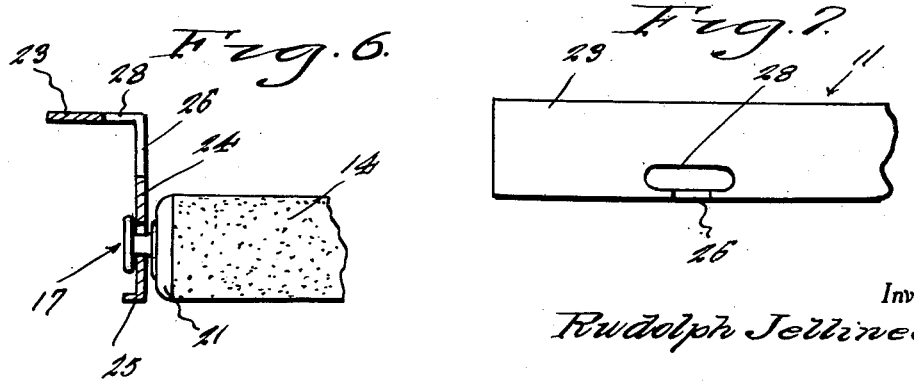
Inventor
Rudolph Jellineck
By Clarence A O'Brien
Attorney Patented Jan. 19, 1932

1,841,954

UNITED STATES PATENT OFFICE

RUDOLPH JELLINECK, OF JACKSONVILLE, FLORIDA

PASSENGER GUARD

Application filed April 13, 1931. Serial No. 529,841.

This invention relates to a motor vehicle appurtenance or appliance in the nature of a guard rope or equivalent device adapted for adjustable support in the rear compartment of an automobile.

More specifically stated, I have accomplished the desired result by providing a feasible type of guard rope and retention means therefor wherein the structure as a whole, is designed to favor the occupants of the rear seat of an automobile by affording the dependable comfort and a sensation of stability when the automobile equipped with this device is travelling on steep grades and unreliable and rough roads.

It is a matter of common knowledge that the occupants of a rear seat of an automobile are frequently subjected to uncomfortable jolting and are possessed by a feeling of insecurity when the machine is traversing unfamiliar and rough highways. This is particularly so for children and grown-ups especially of the feeble age.

Observing that the occupants of a rear seat are frequently injured by being thrown from the seat in case of accident or when the rear portion of the vehicle encounters a sudden depression or a point of rough passage, I have found it expedient and practical to provide an appliance which may be used at the option of the occupant of the machine to afford a convenient flexible handrail or grip of a type which is becoming to the upholstery of the car and which is adjustable and highly useful to promote the desired feeling of reliability and comfort.

In the drawings:

Figure 1 is an elevational view showing a cross section through the rear compartment of an automobile with the guard appliance in operative position.

Figure 2 is a view at right angles to Figure 1 with the guard removed.

Figure 3 is a perspective view of the guard itself.

Figure 4 is a longitudinal detail fragmentary sectional and elevational view on the line 4—4 of Figure 3.

Figure 5 is a perspective view of one of the anchorage fixtures.

Figure 6 is a view showing the specific method of anchoring.

Figure 7 is a fragmentary view of the top flange of the device shown in Figure 5.

I will first call attention to Figures 1 and 2 wherein it will be observed that the rear compartment is designated by the numeral 8, the rear seat cushion at 9 and the backrest at 10. In accordance with the invention I provide a pair of duplicate fixtures 11 constructed for adjustable anchorage purposes and designed to accommodate the especially fabricated guard or sustaining device 12.

This device 12 is of composite construction and is preferably of the form illustrated better in Figure 4. In referring to this figure it will be seen that it comprises a flexible tube 13. This may be and preferably is, a length of hose of appropriate rubber texture. This is concealed and covered by a jacket 14 of appropriate fabric. Mounted in the opposite ends are wooden plugs 15 each being centrally bored to accommodate the stem 16 of an attaching knob generally denoted at 17. This knob includes a neck portion 18, a disc-like head portion 19 and abutment flange 20 bearing against the adjacent end washer 21.

The parts 15 and 16 are maintained in place by a fastening or connecting pin 22 of a double-headed type occupying the position represented in Figure 4. The fixture 11 is detailed in Figure 5 and is adapted to assume a horizontal position at each side of the rear compartment. It comprises a top flange 23, a central vertical web portion 24 and a short reinforcing clip or flange 25 at the bottom.

The web 25 is formed with longitudinally spaced zig-zag slots including upper and lower portions 26 and 27 arranged in companion relationship to provide appropriate keepers for selective reception of the knob 17. The entrance notch 28 is formed in the flange 23 and is in registry with the upper portion 26 of the adjacent zig-zag keeper slot.

In practice it is obvious that the slotted or keeper equipped brackets or fixtures 11 are mounted at opposite sides of the rear compartment, that is, at the ends of the cushions 9. They are attached at the interior at an appropriate elevation so that the guard or retention device 12 may be suspended at a practical elevation.

The device 12 is compressible in character, cylindrical in cross shape for convenience in gripping and provided with convenient headed knobs whereby it may be selectively fitted in any one of the keeper slots. Consequently it is permissible with the device to arrange it so that feeble persons may be held in a dependable erect position and maintained against forward displacement from the rear seat in case of abrupt droppage of the vehicle or other unexpected condition.

The appurtenances constituting the complete ensemble of parts may be of such materials and so ornamental as to make the structure particularly adaptable and fitting to correspond to the upholstery. In fact, the invention may be so developed as to possess a luxurious aspect.

The degree of flexibility is such as to relieve the occupant of undesirable rigidity and at the same time the structure is sufficiently sturdy as to afford a dependable guard when it is necessary to use it. The occupants may rest their arms on the device by adjusting it close to the body. A device of this kind has been especially useful as a rest for a newspaper and enables the occupant to simultaneously hold the paper and grasp the flexible rail or rope in such a way as to support themselves and to hold the paper for expeditious reading without unnecessary jumping and jolting.

As before implied, the invention is not necessarily a permanent fixture and may be employed at the discretion of the occupant of the rear seat. It is adjustable forwardly and rearwardly and suspended at the proper horizontal plane to promote convenience and comfort.

It is thought that the description taken in connection with the drawings will enable a clear understanding of the invention to be had. Therefore, a more lengthy description is thought unnecessary.

While the preferred embodiment of the invention has been shown and described, it is to be understood that minor changes in shape, size, material and arrangement of parts coming within the field of invention claimed may be resorted to in actual practice without departing from the spirit and scope of the appended claims.

I claim:

1. An appurtenance of the class described comprising a longitudinally elongated flexible handgripping rail including a flexible tube, a fabric covering for the exterior thereof, cores mounted in the ends of the tube, and headed knobs carried by and projecting outwardly from the outer end portions of said cores.

2. An appurtenance of the class described comprising a longitudinally elongated flexible handgripping rail including a flexible tube, a fabric covering for the exterior thereof, cores mounted in the ends of the tube, and headed knobs carried by and projecting outwardly from the outer end portions of said cores, and a pair of supporting fixtures adapted to occupy a horizontal position in the rear compartment of an automobile, each fixture being provided with longitudinally spaced keeper slots for selective reception of said knobs.

3. An appurtenance of the class described comprising a longitudinally elongated flexible handgripping rail including a flexible tube, a fabric covering for the exterior thereof, cores mounted in the ends of the tube, and headed knobs carried by and projecting outwardly from the outer end portions of said cores, and a pair of supporting fixtures adapted to occupy a horizontal position in the rear compartment of an automobile, each fixture being provided with longitudinally spaced keeper slots for selective reception of said knobs, and said slots being of zig-zag formation to guard against accidental displacement of the knobs.

4. In an automobile guard for rear compartment use, a pair of duplicate anchorage fixtures, each fixture being of general channel-shaped cross section and including a top flange, a relatively short bottom flange, and an intervening web, said web having longitudinally spaced zig-zag keeper slots, and said top flange having entrance notches in registry with the entrance portions of said slots.

5. In an automobile guard for rear compartment use, a pair of duplicate anchorage fixtures, each fixture being of general channel-shaped cross section and including a top flange, a relatively short bottom flange, and an intervening web, said web having longitudinally spaced zig-zag keeper slots, and said top flange having entrance notches in registry with the entrance portions of said slots, and a longitudinally elongated upholstered sustaining rope provided with headed knobs adapted for selective reception in said keeper slots.

In testimony whereof I affix my signature.

RUDOLPH JELLINECK.